United States Patent [19]

Najvar et al.

[11] Patent Number: 4,714,722

[45] Date of Patent: Dec. 22, 1987

[54] FLY ASH REACTIVE FILLER FOR DEHYDRATING AND BONDING AQUEOUS POLYMERIC COMPOSITIONS

[75] Inventors: Daniel J. Najvar; Brian G. Pope, both of Baton Rouge, La.; Norman R. Loeffler, Tulsa, Okla.

[73] Assignee: The Dow Chemical Company, Midland, Mich.

[21] Appl. No.: 898,858

[22] Filed: Aug. 20, 1986

Related U.S. Application Data

[63] Continuation of Ser. No. 747,593, Jun. 24, 1985, abandoned.

[51] Int. Cl.$^4$ ................................................. C08J 9/32
[52] U.S. Cl. ..................................... 523/218; 428/96; 521/54; 523/219
[58] Field of Search .................. 521/54; 523/218, 219; 428/96

[56] References Cited

U.S. PATENT DOCUMENTS

| | | | |
|---|---|---|---|
| 4,088,804 | 5/1978 | Cornwell et al. | 524/6 |
| 4,229,329 | 10/1980 | Bennett | 524/44 |
| 4,425,440 | 1/1984 | Bloembergen et al. | 521/54 |

*Primary Examiner*—Morton Foelak
*Attorney, Agent, or Firm*—D. R. Howard; D. L. Corneglio

[57] ABSTRACT

A method for accelerating the dehydration of aqueous dispersions and bonding the solids contained therein characterized by the addition of fly ash to the aqueous polymeric composition. The fly ash is added in an amount sufficient to significantly reduce the dehydration time of the composition and generally comprises at least a partial substitution of the mineral filler content of the aqueous polymeric dispersion.

12 Claims, No Drawings

FLY ASH REACTIVE FILLER FOR DEHYDRATING AND BONDING AQUEOUS POLYMERIC COMPOSITIONS

CROSS REFERENCE TO RELATED APPLICATION

This is a continuation of application Ser. No. 747,593, filed June 24, 1985, now abandoned.

BACKGROUND OF THE INVENTION

This invention is directed toward a method for accelerating the dehydration of aqueous polymeric dispersions and improving the bonding of the solids contained therein by the addition of fly ash. Generally, aqueous polymeric compositions of the invention are latexes prepared by adding fly ash to the aqueous dispersion of polymer particles such that the dehydration or set time of the latex composition is significantly reduced as compared to a latex composition prepared in the absence of fly ash. In addition to the decrease in dehydration time, the polymeric compositions have enhanced physical properties due to the reactive nature of the fly ash which improves the bonding of the solids.

A latex composition is generally defined as a stable dispersion of a polymeric substance in an essentially aqueous medium. Latex compositions are employed in a variety of uses which require that the aqueous phase be removed such that the polymeric particles and other solids present in the aqueous phase can be distributed onto a substrate and form a film. The formation of this film generally requires a substantial amount of energy in order to remove the aqueous phase portion of the latex composition. Methods of reducing the amount of energy needed to remove the aqueous phase are, therefore, desirable. It is further desirable to develop means to improve the physical interaction of the various solids present in the latex composition such that films having increased physical properties can be formed.

Fly ash is a waste by-product of large scale coal fueled power generation plants and; therefore, it is desirable to find uses for fly ash from an ecological standpoint. Attempts to utilize fly ash have been made as disclosed in U.S. Pat. No. 4,088,804 where fly ash is added to cement compositions to react with the calcium hydroxide produced during the curing of the cement. Additionally, U.S. Pat. No. 4,425,440 discloses that fly ash can be employed to form a thermally insulating material and a flame retardant thermal insulation and U.S. Pat. No. 4,229,329 discloses the use of fly ash to prepare a fire retardant coating composition useful as paints or mastics.

The subject method for employing fly ash in latex compositions greatly reduces the energy requirements required for removing the latex solids from the aqueous phase and additionally provides enhancement of the physical properties of the latex film. The use of fly ash in the preparation of latex films therefore is of great ecological value in that it reduces the energy required to prepare a latex film and takes advantage of a by-product from the production of energy.

SUMMARY OF THE INVENTION

The present invention is a method for accelerating the dehydration of aqueous polymeric dispersions and bonding the solids contained therein characterized by adding fly ash to the composition in an amount sufficient to significantly reduce the dehydration time of the composition compared to a similar composition prepared in the absence of fly ash. One preferred fly ash is a Class-C fly ash having a particle size of about 1 to about 100 microns. In one aspect, the fly ash is dispersed into the composition simultaneously with the application of the composition to a substrate material. The subject composition is particularly useful in the coating of carpets or scrims thereof and paper products.

Generally, the polymeric aqueous dispersion comprises polymeric particles and mineral fillers dispersed in an aqueous medium. The mineral filler portion is at least partially substituted by fly ash. A typical mineral filler used is calcium carbonate.

Generally, the substitution of fly ash for the mineral filler is from about 1 to 10 percent. In yet another aspect, the fly ash substitutes from about 50 to 100 percent of the mineral filler.

The present invention provides an economical means for dehydrating polymeric aqueous dispersions while at the same time providing an outlet for a waste product generated from the burning of fossil fuels.

DETAILED DESCRIPTION OF THE INVENTION

The method for accelerating the dehydration of an aqueous dispersion of polymeric particles is dependent upon the fly ash component added and dispersed into the aqueous phase. In addition to providing rapid dehydration or set of the composition, the fly ash can also enhance the physical properties of films formed from the aqueous polymeric dispersion. The fly ash improves the physical properties of the composition by acting as a reactive filler material which improves the bonding of the solids.

Enhancement of the physical properties of the polymeric composition is a result of the chemical hydration characteristic of the fly ash. That is, the fly ash rapidly absorbs water when dispersed in an aqueous dispersion of polymeric particles. This chemical hydration initiates a strong interparticle attraction between the solids and effectively bonds the filler materials, polymeric particles, fly ash and other solid components present in the aqueous dispersion. Thus, enhancement of strength and integrity of the final product is achieved through this method of bonding the solids present in an aqueous polymeric dispersion.

The fly ash component employed in the practice of the present invention is generally available as a waste by-product of large-scale coal fueled power generation plants. In addition, fly ash is available from the process employed to gasify coal. The chemical composition of the fly ash is dependent upon the coal source, how the coal was burned and the collection method. Therefore, the properties of fly ash are a function of the composition of the coal, the particle size of the fly ash and the temperature of combustion.

Typically, the fly ash is a light brown powder (tiny/spheres 1–100 microns in diameter) having no odor. The chemical composition of fly ash generally comprises in major portion $SiO_2$, $Al_2O_3$, and $Fe_2O_3$ and in minor portion $CaO$, $MgO$, $Na_2O$, $K_2O$, $SO_3$, and $TiO_2$. The preferred fly ashes for use herein generally have a moisture content of less than about 3 weight percent on a total weight basis and/or will typically exhibit a loss on ignition (LOI) value of less than 5 weight percent on a total weight basis.

The fly ash material preferred in the subject invention is categorized as "Class C" fly ash pursuant to ASTM Standard C-618. Generally, Class C fly ash is derived from the combustion of lignite and subbituminous coal.

Fly ash is further defined in the art by employing the name of the city in which it is produced, for example, Gentry, Boyce, or Cason. Specific examples of generally suitable fly ash materials for use in the present invention from six different states in the United States along with the chemical composition thereof are summarized in Table I below.

In either low or high fly ash substitution ranges, the subject polymeric composition has significantly reduced dehydration time and; therefore, allows for more economical drying of coated substrates. Also, because the drying times are reduced, lower drying temperatures can be employed without a loss in processing time which can advantageously affect the quality of the substrate materials. For example, lower heat history for paper and carpet products can improve their life, appearance and physical properties.

The fly ash is dispersed in the aqueous polymeric

TABLE I

| \multicolumn{12}{c}{CHEMICAL COMPOSITION OF REPRESENTATIVE TYPE C FLY ASHES (%)} | | | | | | | | | | | |
|---|---|---|---|---|---|---|---|---|---|---|---|
| Fly Ash Number | Source | $SiO_2$ | $Al_2O_3$ | $Fe_2O_3$ | Total $SiO_2$ + $Fe_2$ + $Al_2O_3$ | Total CaO* | MgO | $Na_2O$ | $K_2O$ | $SO_3$ | $TiO_2$ | LOI |
| 1 | Oklahoma | 37.7 | 18.3 | 6.50 | 62.4 | 23.3 | 5.00 | 1.40 | 1.20 | 1.20 | 1.30 | ND |
| 2 | Arkansas | 32.0 | 16.9 | 5.25 | 54.15 | 24.1 | 4.50 | 1.20 | 0.42 | 2.90 | 1.34 | 0.57 |
| 3 | Oklahoma | 33.0 | 18.1 | 6.20 | 57.3 | 23.0 | 4.45 | 1.00 | 0.59 | 1.90 | 1.30 | 1.00 |
| 4 | Oklahoma | 36.5 | 16.6 | 5.60 | 58.7 | 19.0 | 3.70 | 0.68 | 0.70 | 1.40 | 1.35 | 0.33 |
| 5 | Texas | 41.1 | 16.7 | 6.10 | 63.9 | 23.5 | 4.30 | 0.70 | 1.20 | 1.40 | 1.55 | 0.40 |
| 6 | Texas | 36.4 | 20.0 | 6.20 | 62.6 | 24.1 | 4.20 | 1.60 | 0.98 | 1.40 | 1.68 | 0.43 |
| 7 | Texas | 34.5 | 15.7 | 6.34 | 56.54 | 27.2 | 5.70 | 1.40 | 0.96 | 2.80 | 1.27 | 0.48 |
| 8 | Kansas | 33.7 | 17.8 | 6.40 | 57.9 | 30.9 | 6.50 | 1.50 | 1.20 | 3.00 | 1.62 | 0.71 |
| 9 | Kansas | 41.1 | 19.6 | 7.10 | 67.8 | 25.8 | 5.90 | 0.69 | 1.30 | 1.60 | 1.58 | 0.34 |
| 10 | Kansas | 31.0 | 16.7 | 6.20 | 53.9 | 33.9 | 5.60 | 1.80 | 1.10 | 3.86 | 1.70 | 0.91 |
| 11 | Kansas | 38.8 | 17.1 | 6.90 | 62.8 | 26.3 | 4.90 | 0.82 | 1.30 | 1.50 | 1.60 | 0.51 |
| 12 | Minnesota | 31.5 | 15.8 | 8.80 | 56.1 | 25.2 | 6.60 | 10.10 | 1.20 | 10.00 | 0.68 | 0.32 |
| 13 | Texas | 27.6 | 15.5 | 6.72 | 49.82 | 27.7 | 7.00 | 2.30 | 0.87 | 3.90 | 1.85 | 0.44 |
| 14 | Arkansas | 28.3 | 15.9 | 6.62 | 50.82 | 28.3 | 6.30 | 2.40 | 0.88 | 3.40 | 1.79 | 0.54 |
| 15 | Texas | 35.8 | 18.3 | 6.49 | 60.59 | 25.0 | 5.60 | 1.40 | 1.00 | 2.02 | 1.87 | 0.46 |
| 16 | Oklahoma | 37.5 | 19.7 | 6.95 | 64.15 | 23.2 | 5.10 | 1.20 | 1.00 | 1.57 | 1.64 | 0.48 |
| 17 | Wyoming | 45.7 | 18.7 | 4.97 | 69.37 | 16.7 | 2.40 | 0.50 | 1.60 | 0.90 | 1.00 | 1.89 |
| 18 | Wyoming | 47.9 | 19.2 | 2.42 | 69.52 | 28.3 | 0.68 | 0.50 | 1.10 | 0.10 | 0.59 | 2.15 |
| 19 | Arkansas | 30.5 | 16.7 | 6.56 | 53.76 | 27.2 | 5.80 | 2.00 | 0.86 | 3.40 | 1.85 | 0.75 |
| 20 | Wyoming | 28.7 | 16.2 | 7.45 | 52.35 | 27.4 | 7.40 | 2.40 | 0.95 | 3.50 | 1.65 | 0.60 |
| 21 | Wyoming | 36.5 | 19.2 | 8.02 | 63.72 | 21.4 | 5.90 | 2.10 | 0.97 | 1.20 | 1.39 | 0.18 |

*Total calcium content expressed as CaO.
ND means not determined.

The amount of fly ash which can be substituted for the mineral filler content of a particular polymeric aqueous dispersion can vary from as much as all of the filler to only a small portion of the filler. Smaller amounts of from about 1 to about 10 percent substitution of the mineral filler results in a thixotropic composition having significantly decreased dehydration time. Larger amounts of fly ash substitution, i.e., more than about 50 percent, results in very short drying time for the polymeric composition. Intermediate amounts of fly ash substitution, 10–50 percent, can also be employed to obtain desirably rheological properties and shortened dehydration time. At larger amounts, it is recommended that the fly ash be admixed just prior to coating a particular substrate in order to avoid premature set. More preferably, where large substitutions are employed, the fly ash is dispersed into the composition simultaneously with the application of the composition to a substrate material.

Accordingly, the range of fly ash which can be employed in a polymeric aqueous dispersion is from about 1 to about 800 parts per hundred polymer (phr); preferably, from about 3 to about 400 phr. At the lower range, compositions having desirable rheological properties which facilitates placement on a desired substrate and significantly reduces dehydration time. At the upper range, a composition having greatly reduced dehydration time and enhanced film properties is obtained. This, therefore, provides the practitioner with a broad choice of substitution to meet any particular application.

dispersion by employing methods well known in the art for dispersing solid particulate into aqueous compositions in order that a homogeneous dispersion thereof can be obtained.

For purposes of this invention, the polymeric aqueous dispersion is defined as a stable dispersion of a polymeric substance in an essentially aqueous medium or, more simply stated, an aqueous dispersion of polymeric particles. This definition also includes the well recognized latex compositions. The aqueous dispersions can additionally contain other components typically present in polymeric compositions. For example, the aqueous dispersion can contain thickeners, plasticizers, curing agents, accelerators, stabilizers, colorants, fungicides, and fillers. It has been found that the subject invention is particularly adaptable to latex compositions employed in the manufacture of carpet and paper products where a fast drying time and enhanced physical properties are desirable. The particular polymeric component utilized in the latex composition is not critical. Therefore, various polymers such as styrene/butadiene latexes, acrylic, acrylate, vinyl acetate, acrylonitrile, ethylene and copolymers thereof can be employed in the subject invention.

The present polymeric compositions are characterized by having fly ash admixed therein in at least partial substitution for the mineral filler content of the composition. Examples of mineral fillers include, but are not limited to, alumina, aluminum hydrates, feldspar, talc, calcium carbonates, clay, carbon black, quartz, novaculite and other forms of silica, kaolinite, benonite, garnet, mica, saponite, beidellite, calcium oxide, calcium hydroxide, etc.

Advantageously these latexes are employed in the area of paper coatings, adhesives, carpet backing and/or other filler systems containing latex binders. Specifically, the subject compositions have shorter drying times and improved physical properties or film integrity due to the enhanced binding of the solids caused by the reduction of water by the fly ash. The following examples are provided to illustrate the utility of the subject invention and are not limitations thereof.

EXAMPLE 1

Two base latex formulations were prepared to demonstrate the improvement provided by substituting fly ash for a portion of the calcium carbonate mineral filler. "A" is a comparative example and "B" is the subject invention having 50 percent of the filler material replaced by Class C Fly Ash. The ingredients are based on parts per hundred polymer, unless otherwise indicated, for each formulation as follows:

| Ingredients | Formulation A | Formulation B |
|---|---|---|
| Latex (64.5 styrene/35.5 butadiene) | 190 | 190 |
| $CaCO_3$ | 400 | 200 |
| C-Fly Ash | — | 200 |
| $H_2O$ | 120 | 120 |
| Surfactant | 2 ml | 2 ml |

Each formulation was blended until homogeneous with the surfactant being added last. The formulations were frothed by whipping to increase their volume and then applied between two sheets of one-square foot burlap. The physical characteristics of the two formulations are as follows:

| | Formulation A | Formulation B |
|---|---|---|
| % volume increased by frothing | 57% | 57% |
| Grams of formulation applied to burlap | 230 | 238 |
| Time until formulation was dry to touch | 2 hrs | 35 min |
| Peel strength after 65 hrs. drying at room temp. | 1.1 kg | 3 kg |

As can be seen from the physical characteristics for the subject invention, Formulation B exhibited accelerated drying time and improved physical strength over the comparative latex, Formulation A.

EXAMPLE II

A base latex formulation having a calcium carbonate mineral filler load of 600 phr was substituted with varying amounts of fly ash and the rate of drying measured. The percent dryness of the latex films formed were calculated over time in a 275° F. oven. The percent substitutions of Class C fly ash for calcium carbonate are indicated below with the percent dryness shown from 30 to 120 seconds.

| Percent Fly Ash Substituted for $CaCO_3$ | Percent Dryness at | | |
|---|---|---|---|
| | 30 seconds | 60 seconds | 120 seconds |
| 0 | 20 | 30 | 55 |
| 1 | 40 | 50 | 80 |
| 2 | 31 | 53 | 70 |
| 3 | 54 | 70 | 96 |
| 4 | 48 | 87 | 95 |
| 5 | 42 | 60 | 86 |

The dryness measurements indicate the significantly increased drying rate for latex compositions substituted with small amounts of fly ash, i.e. 1 to 5 percent by weight mineral filler.

What is claimed is:

1. A method for accelerating the dehydration of an aqueous polymeric dispersion composition comprising polymeric particles and mineral filler dispersed in an aqueous medium and improving bonding of the solids contained therein, the method consisting essentially of adding Class C fly ash as the sole water-reducing agent to said composition in an amount sufficient to significantly reduce the dehydration time of said composition compared to compositions which are identical save for the absence of Class C fly ash.

2. The method of claim 1 wherein said Class C fly ash has a particle size of about 1 to about 100 microns.

3. The method of claim 1 wherein said fly ash is dispersed into said composition simultaneously with the application of said composition to a substrate material.

4. The method of claim 3 where said substrate material is carpet or scrim thereof.

5. The method of claim 3 where said substrate is a paper product.

6. The method of claim 1 where said mineral filler is at least partially substituted by fly ash.

7. The method of claim 6 where said mineral filler is calcium carbonate.

8. The method of claim 6 where said fly ash substitutes from about 1 to about 10 percent of said mineral filler.

9. The method of claim 6 where said fly ash substitutes from about 50 to about 100 percent of said mineral filler.

10. The method of claim 1 wherein the amount of Class C fly ash is from about one to about 800 parts per hundred parts of polymer in the aqueous polymeric dispersion composition.

11. The method of claim 1 wherein the amount of Class C fly ash is from about three to about 400 parts per hundred parts of polymer in the aqueous polymeric dispersion composition.

12. The method of claim 1 wherein the dehydration time is reduced by at least one-half when fifty percent of the mineral filler is replaced by Class C fly ash.

* * * * *